Figure 1:
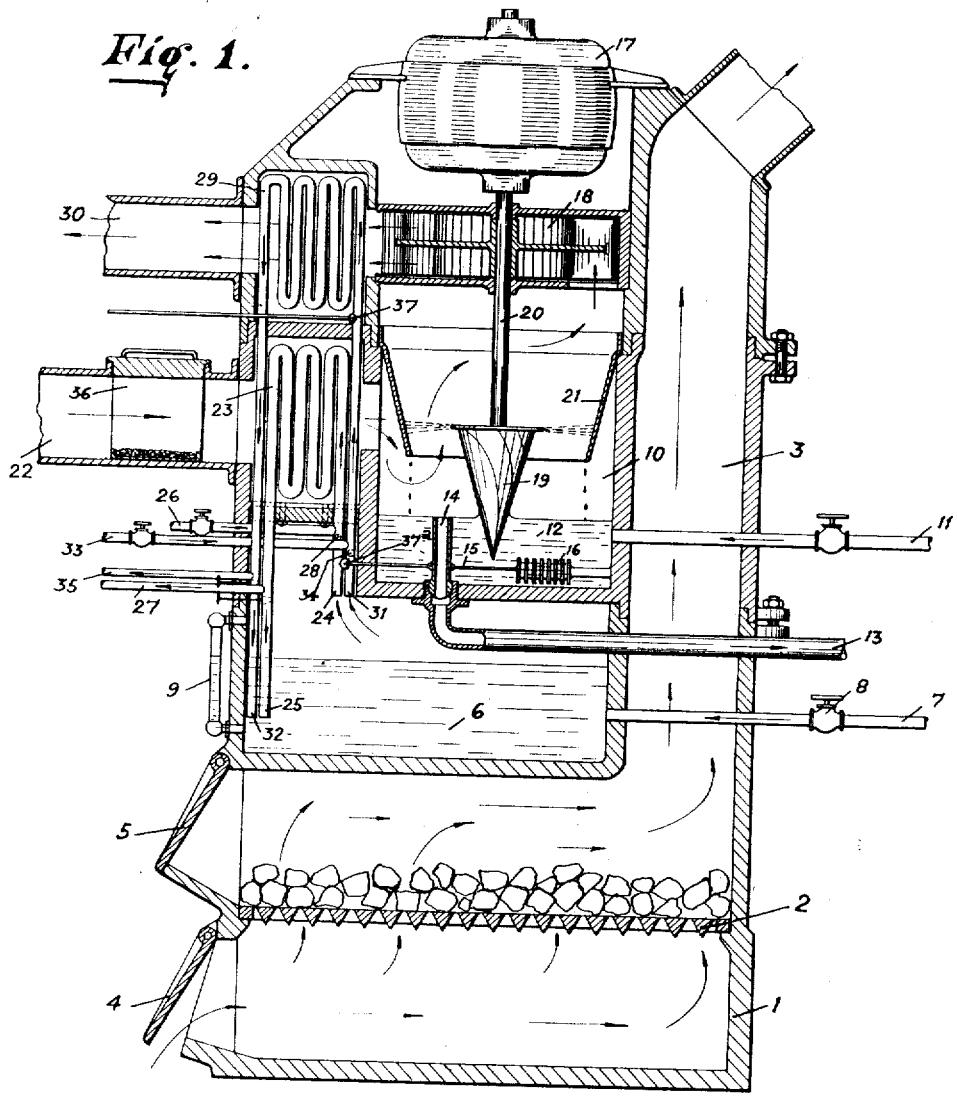

Sept. 1, 1931.   W. L. FLEISHER   1,821,886
HEATING AND HUMIDIFICATION SYSTEM AND APPARATUS
Filed Aug. 28, 1928

INVENTOR.
Walter L. Fleisher
BY
ATTORNEYS.

Patented Sept. 1, 1931

1,821,886

UNITED STATES PATENT OFFICE

WALTER L. FLEISHER, OF NEW YORK, N. Y., ASSIGNOR TO THE COOLING & AIR CONDITIONING CORPORATION, OF NEW YORK, N. Y., A CORPORATION OF NEW YORK

HEATING AND HUMIDIFICATION SYSTEM AND APPARATUS

Application filed August 28, 1928. Serial No. 302,519.

This invention relates to methods of and means for conditioning air or gases in a heating and cooling system.

The general object of the invention is to provide for the production and maintenance of desired conditions of humidity and temperature within an enclosure regardless of climatic conditions and changes outside the enclosure.

The ordinary heating system, equipped to heat an enclosure by steam, hot water, or hot air can be designed to regulate the dry bulb temperature of a room with a fair degree of accuracy. The medium, if steam or hot water, circulates through the usual piping and radiator system, which, in turn, gives off its heat to the surrounding area. If hot air system is used, the air drawn into the system, regardless of its dew point or relative humidity, is merely heated to a greater dry bulb temperature before discharge into the air to be treated. In all such cases the moisture content of the treated atmosphere remains unregulated and no control exercised over the relative humidity for the different temperatures produced.

Inasmuch as human comfort under climatic changes depends upon the degree of moisture content in the air as well as on temperature, the problem of proper humidification is highly important. Furthermore, in the conditioning of areas for industrial requirements, the production and maintenance of proper humidity conditions often determines the quality of a product and the efficiency of a plant. It is, therefore, an object of the invention to regulate relative humidity of air adapted to serve an enclosure by utilizing a heating means designed to maintain desired dry bulb temperatures.

A feature of the invention resides in the provision of a vaporizer or atomizer means in a unit structure arranged to supply heat to a given area, the heating and humidifying operations being conducted simultaneously.

A further feature, in connection therewith, provides for automatically regulating the humidification of air at any given temperature, so that the dry bulb may be kept at a lower level than that required when no humidification control is provided. By controlling the moisture content, a degree of comfort is obtained, rarely produced solely by dry bulb temperature control, regardless of the level to which the dry bulb reading is raised. A saving in fuel is therefore effected in addition to the greater comfort obtained.

A further object is to produce temperature conditions within an enclosure lower than those therewithout, without resort to refrigeration, and by utilization of the general arrangement of apparatus designed for use as a heater and humidifier means under winter operating conditions.

A feature of the invention resides in the conversion of air having a certain temperature and relative humidity, to a condition at a lower temperature by dehydrating the air to a desired dew point temperature. In lowering the temperature of air, it is usual to withdraw the heat contents therefrom by refrigeration. This entails the withdrawal of heat and moisture vapor contents. The application of refrigeration not only demands initial installation and maintenance, but where refrigeration reduces the air to a condition too low for comfort, the necessity for raising the temperature to a desired dry bulb level requires a heating medium. Under summer conditions this is undesirable as well as expensive.

Applicant proposes using a dehydrator in combination with the system adapted for operation under winter conditions, whereby air will be dehydrated and then brought to a dry bulb temperature approximating that of ordinary well water or city main water. As a result the wet bulb temperature is reduced to a point temperature above the dew point but very considerably below the dry bulb temperature. By then saturating the air at said wet bulb temperature, the dry and wet bulb temperature will coincide and a reduction in dry bulb temperature produced without refrigeration. By controlling the dew point, the resultant desired temperature may be obtained without reheating. As a result, substantially the same system may be used under winter and summer operating conditions to produce temperatures either above or below outside climatic conditions, and all substantially automatically controlled to effect desired regulation of dry bulb and wet bulb temperatures, relative humidity and dew point.

Further features covering advantages of installation, operation and control in a system of the character described, will be more apparent in the following description, read in connection with the accompanying drawing illustrating one form of incorporating the features of the invention.

Considering the illustration, the figure designates a heating plant adapted to heat an enclosure. The connecting conduits for serving the areas to be heated are not shown but may be of any ordinary type connected to the main plant 1. Grate 2 is shown equipped for coal-burning use but it is apparent that oil or any other fuel may be used for heating purposes, the products of combustion proceeding thru stack 3 as indicated. Vent door 4 and fuel door 5 are ordinary in construction as are the other structural features, usually found in a plant of the type illustrated. A water chamber 6 is supplied by an inlet 7 controlled by valve 8, the level being indicated by gauge glass 9. While the apparatus shown utilizes steam for heating purposes, the objects of the invention can be equally carried out in a hot water or hot air system.

Vaporizer chamber 10 is illustrated on a relatively larger scale in order to more clearly illustrate its apparatus and functions. Water inlet 11 serves reservoir 12 within the vaporizer chamber. Outlet 13 is equipped with an automatic overflow device 14 which is adapted to maintain a substantially constant or predetermined level in the reservoir. As illustrated, the overflow may be mounted in a ballbearing or other suitable supporting device so that when it is in upright position it will maintain a maximum level of water in the reservoir, whereas upon being inclined responsive to the actuation of element 15 under control of thermostat 16, it will lower the level to a desired point. When the overflow returns to vertical position the extreme level will again be restored. Motor 17 is suitably supported on the casting and, as illustrated, is arranged to drive fan 18 and atomizer 19, both mounted on shaft 20. The atomizer may be in the form of a rifled cone or may be otherwise suitably designed to break up a quantity of water into a thin spray or mist upon being rotated in the reservoir. Baffle or apron 21 is mounted within the atomizer chamber, its lower portion projecting below the top of the atomizer, so that the spray thrown therefrom impinges against the inner surface of the apron. It is patent that any desirable means for breaking up the water to a predetermined degree of fineness, may be employed in combination with baffle means suitably arranged to route the spray and the air passing in contact therewith.

Air inlet 22 has access to the atmosphere or to any other area from which a current of air may be drawn within the apparatus over coils 23 and into the vaporizer chamber. As illustrated, steam produced in chamber 6 will serve the coils, rising through inlet 24. Outlet 25 serves as a drain for condensed moisture. Water inlet 26 is adapted to serve coils 23 in the course indicated by the arrows, the outlet pipe being designated 27. Drop valve 28 will prevent water flowing down to chamber 6 under summer operating conditions, but will open when steam is supplied under winter conditions. Coils 29 are positioned in the apparatus adjacent air outlet 30. These coils are similarly adapted to be heated by steam from chamber 6, the inlet pipe being shown as 31 and the outlet extending within the water at 32. Similarly, inlet 33 serves to supply water to the coils, if desired, drop valve 34 acting as an automatic shut-off, the outlet from said coils being through pipe 35.

Dehydrator chamber 36 is preferably made removable so that under winter operating conditions it will be withdrawn from the passage, whereas under summer conditions it may be inserted and removed as desired.

Considering the operation of the system under winter operating conditions, when the dehydrating chamber is not employed, the air will be drawn within inlet 22 due to the action of fan 18. The air will be drawn over steam coils 23 which will be heated by steam generated in chamber 6 in the usual manner. After being heated by the coils the air will proceed within the atomizer chamber, pass through the spray or mist produced by the rifled cone and then be exhausted through chamber 30 after passing through and contacting with steam coils 29. Due to initially being heated by steam coils 23, the air will be able to absorb a greater amount of moisture than it would have been able to hold at the lower temperature of the outside atmosphere. Since the amount of moisture it absorbs will be determined by its temperature, and the volume of moisture supplied, it is apparent that by controlling the level of the water in the vaporizer chamber, the relative humidity of the air leaving the chamber will be regulated. In consequence, thermostat 16 is adapted to function responsive to wet bulb conditions within the enclosure, so that as the wet bulb temperature declines within the enclosure, a greater volume of water will be broken up by the cone and greater humidification effected. However, if the wet bulb temperature goes up and it is desired to reduce the quantity of moisture absorbed by air passing through the atomizer, the thermostat will incline overflow device 14, whereupon the level of the water will fall and a smaller volume of water be broken up. After the humidification step is completed the air is further contacted with coils 29 which adds superheat to the air and raises its dry bulb temperature. A thermostat control not shown, acting responsive to the dry bulb temperature in the enclosure is adapted to cut off the supply of steam to coils 29 at valve 37, if the dry bulb goes too high. Similarly, valve 37ª may be actuated responsive to thermostat 16 to shut off the steam to coils 23, thus controlling extent of humidification.

Considering the operation of the system under summer operating conditions, dehydrator 36 is removably positioned as indicated, and is arranged to allow air from passage 22 to be routed therethrough responsive to the suction of fan 18. The dehydrator chamber is arranged to expose a quantity of silica gel or other substances having the characteristic of absorbing moisture. Silica gel is particularly suited for the purpose inasmuch as it can absorb an amount of moisture equivalent to many times its weight, and may be used indefinitely inasmuch as the property remains unimpaired upon the removal of the moisture whereupon it may be used again. From the dehydrator the air contacts with coils 23 which are now being cooled by well water or urban main water through the path hereinbefore indicated. The action of the silica gel in withdrawing moisture from the air produces a rise in temperature, inasmuch as the latent heat of the withdrawn moisture is given out as sensible heat. The air leaving the dehydrator, therefore, has a very low dew point but a higher dry bulb temperature than originally. However, upon contacting with coils 23 it will be brought to a temperature approximating that of the water passing therethrough. The dew point of course remains the same. The reduction of temperature by the coils 23 establishes a wet bulb considerably below the dry bulb temperature. Upon proceeding into the atomizer chamber, the air will then be saturated upon passing through the spray whereupon the dry bulb temperature will coincide with the wet bulb. Air will thus be produced at the wet bulb temperature which may be considerably below the outside dry bulb, and this without refrigeration. Coils 29 need not be employed as water passages unless desired. The air at the wet bulb temperature is then drawn by the fan and exhausted through outlet 30.

The dehydrator chamber may be removed for replacement, and may be arranged to be replaced by any suitable link in inlet 22 under winter operating conditions. It is evident that various arrangements may be improvised for dehydrating air and reducing the wet bulb temperature. It is also evident that the system may have various modifications and changes in structural detail for controlling the dry bulb temperature and relative humidity under winter operating conditions.

Since certain changes in carrying out the invention and in employing the system and apparatus outlined may be made without departing from the scope herein, it is intended that all matter contained in the above description or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new, and desire to secure by Letters Patent, is:

1. Apparatus of the character described comprising an inlet duct to the apparatus, a dehydrator in the duct, tempering coils for initially changing the temperature of air entering the apparatus, means for humidifying said air, means for discharging said air through a second set of tempering coils, said coils and humidifying means being automatically controlled to regulate the wet and dry bulb temperatures of the air conditioned by the apparatus, means under summer operating conditions for reducing the temperature of the air entering the apparatus and saturating it at a desired wet bulb temperature, and means operable under winter operating conditions for raising the temperature of incoming air by a medium other than that used for lowering the temperature under summer operating conditions, said heating and cooling media circulating in the same apparatus.

2. An apparatus of the character described including an air dehydrator, an air cooling unit arranged to the rear of said dehydrator, means for producing a water spray through which such air passes and, in turn beyond such unit, a second unit for varying the temperature of the air and arranged to the rear of such spray producing means, and means operative when said dehydrator is rendered inoperative to cause said units to raise the temperature of the air.

3. An apparatus of the character described including an air dehydrator, an air cooling unit arranged to the rear of said dehydrator, means for producing a water spray through which such air passes and, in turn beyond such unit, a second unit for varying the temperature of the air and arranged to the rear of such spray producing means, and means operative in response to the condition of such air for varying the volume of the water spray.

4. An apparatus of the character described including an air dehydrator, an air cooling unit arranged to the rear of said dehydrator is rendered inoperative to cause spray through which such air passes and, in turn beyond such unit, a second unit for varying the temperature of the air and arranged to the rear of such spray producing means, means operative when said dehydrator is rendered inoperative to cause said units to raise the temperature of the air, and means for forcing a circulation of air past such units and said spray producing means.

In testimony whereof I affix my signature.

WALTER L. FLEISHER.

spray through which such air passes and, in turn beyond such unit, a second unit for varying the temperature of the air and arranged to the rear of such spray producing means, and means operative in response to the condition of such air for varying the volume of the water spray.

4. An apparatus of the character described including an air dehydrator, an air cooling unit arranged to the rear of said dehydrator is rendered inoperative to cause spray through which such air passes and, in turn beyond such unit, a second unit for varying the temperature of the air and arranged to the rear of such spray producing means, means operative when said dehydrator is rendered inoperative to cause said units to raise the temperature of the air, and means for forcing a circulation of air past such units and said spray producing means.

In testimony whereof I affix my signature.

WALTER L. FLEISHER.

CERTIFICATE OF CORRECTION.

Patent No. 1,821,886.                    Granted September 1, 1931, to

WALTER L. FLEISHER.

It is hereby certified that error appears in the printed specification of the above numbered patent requiring correction as follows: Page 1, line 91, after "point" strike out the word "temperature" and insert the same to follow after "point" in line 92; page 4, line 11, claim 4, strike out the words "is rendered inoperative to cause" and insert instead , means for producing a water; and that the said Letters Patent should be read with this correction therein that the same may conform to the record of the case in the Patent Office.

Signed and sealed this 8th day of December, A. D. 1931.

M. J. Moore,
Acting Commissioner of Patents.

(Seal)

CERTIFICATE OF CORRECTION.

Patent No. 1,821,886.                                                 Granted September 1, 1931, to

WALTER L. FLEISHER.

It is hereby certified that error appears in the printed specification of the above numbered patent requiring correction as follows: Page 1, line 91, after "point" strike out the word "temperature" and insert the same to follow after "point" in line 92; page 4, line 11, claim 4, strike out the words "is rendered inoperative to cause" and insert instead , means for producing a water; and that the said Letters Patent should be read with this correction therein that the same may conform to the record of the case in the Patent Office.

Signed and sealed this 8th day of December, A. D. 1931.

(Seal)                                                                       M. J. Moore,
                                                                            Acting Commissioner of Patents.